(12) United States Patent
Heimala et al.

(10) Patent No.: US 7,789,332 B2
(45) Date of Patent: Sep. 7, 2010

(54) METHOD FOR CONTROLLING OXYGEN WHEN SEPARATING MINERALS FROM A SLURRY

(75) Inventors: Seppo Heimala, Pori (FI); Heikki Laurila, Vihti (FI); Mikko Ruonala, Pori (FI)

(73) Assignee: Outotec Oyj, Espoo (FI)

( * ) Notice: Subject to any disclaimer, the term of this patent is extended or adjusted under 35 U.S.C. 154(b) by 1372 days.

(21) Appl. No.: 10/547,993

(22) PCT Filed: Mar. 10, 2004

(86) PCT No.: PCT/FI2004/000130

§ 371 (c)(1),
(2), (4) Date: Sep. 7, 2005

(87) PCT Pub. No.: WO2004/080599

PCT Pub. Date: Sep. 23, 2004

(65) Prior Publication Data

US 2006/0169643 A1    Aug. 3, 2006

(30) Foreign Application Priority Data

Mar. 14, 2003    (FI) .................................. 20030380

(51) Int. Cl.
*B02C 19/00* (2006.01)

(52) U.S. Cl. .............................. 241/20; 241/21; 241/25; 241/DIG. 14

(58) Field of Classification Search ...................... 209/3, 209/9, 164, 166, 167; 210/757–760; 241/20, 241/21, 48, 25, DIG. 14
See application file for complete search history.

(56) References Cited

U.S. PATENT DOCUMENTS

| 2,867,529 | A |   | 1/1959  | Forward et al.           |
|-----------|---|---|---------|--------------------------|
| 3,954,450 | A | * | 5/1976  | Kuhn et al. ........... 75/743 |
| 4,003,396 | A |   | 1/1977  | Fleischmann              |
| 4,331,635 | A | * | 5/1982  | Arbiter et al. ......... 423/33 |
| 5,108,495 | A | * | 4/1992  | Heimala et al. .......... 75/386 |
| 5,695,130 | A | * | 12/1997 | Csendes ................. 241/19 |
| 6,041,941 | A |   | 3/2000  | Newell et al.            |

FOREIGN PATENT DOCUMENTS

| GB | 760624     | 11/1956 |
| GB | 1225690    | 3/1971  |
| GB | 1404243    | 8/1975  |
| WO | WO 02087770| 11/2002 |

* cited by examiner

*Primary Examiner*—Mark Rosenbaum
(74) *Attorney, Agent, or Firm*—Chernoff, Vilhauer, McClung & Stenzel

(57) ABSTRACT

The invention relates to a method for controlling the partial pressure of oxygen when mutually separating minerals in the different process steps of the separation process. In order to control the partial pressure of oxygen, the gases fed in the different process steps are recirculated in an essentially closed gas circulation created around the equipment used in the different process steps, so that the gas recirculation is controlled by measuring the potential of the slurry containing valuable minerals.

24 Claims, No Drawings

METHOD FOR CONTROLLING OXYGEN WHEN SEPARATING MINERALS FROM A SLURRY

This application is the national phase application under 35 U.S.C. §371 of International Application No. PCT/FI2004/000130 filed on Mar. 10, 2004, entitled, "METHOD FOR CONTROLLING OXYGEN WHEN SEPARATING MINERALS FROM A SLURRY" which claims the benefit of Finnish Patent Application No. 20030380 filed on Mar. 14, 2003.

The invention relates to a method for controlling the partial pressure of oxygen when mutually separating minerals from a slurry containing valuable minerals in various different sub-steps of a process. The partial pressure of oxygen is controlled by recirculating the gas conducted into the process or into various sub-steps of the process.

After crushing and grinding, the various different minerals contained in ore are mutually separated, as selectively as possible, in different sub-steps of the process, such as flotation, precipitation and filtering, from the slurry to be treated. From the point of view of the process, it is important that the rate of oxidation on the surface of the different minerals, i.e. the electrochemical potential of the minerals, is controlled by means of the oxygen contained in the air and by chemicals, so that the minerals to be flotated are made hydrophobic on the surfaces, and respectively the minerals to be settled are made hydrophilic. An overoxidation of the minerals results in non-selectivity and weakened recovery, as well as in increased chemical expenses.

It is well known in the prior art that the oxygen to be conducted in the various sub-steps of the process is the largest factor affecting the oxidation of the mineral surfaces. For example, in flotation there is normally used air as the flotation gas, and thus the quantity of the dissolved oxygen is more or less saturated, when the quantity of oxygen is calculated on the basis of the 21% contained by air. It is also well-known in the prior art that one of the most important reasons for an unsatisfactory operation of the sub-processes following flotation, i.e. precipitation and filtering, is the lack of control of the oxidation-reduction conditions in the slurry under treatment.

In the U.S. Pat. No. 6,044,978, there is described a method for recovering copper and nickel, as well as platinum group metals (PGM) from sulfidic ores containing said metals. In said method, reagent conditioning is carried out in conventional fashion, but further conditioning of the slurry is carried out in the presence of a non-oxidizing gas, such as nitrogen. The flotation steps are performed normally by air or at least by a gas with an oxygen content that is higher than that of a gas used in the conditioning step preceding flotation. According to the U.S. Pat. No. 6,044,978, the use of a non-oxidizing gas improves the separation of sulfide minerals from the rest of the ore.

However, the use of nitrogen or other non-oxidizing gases such as carbon dioxide, methane, ethane, propane or sulfur dioxide is not necessarily economic. For example the use of nitrogen or hydrocarbons requires that a corresponding plant is built in connection with the concentrator.

The object of the invention is to eliminate drawbacks of the prior art and to achieve an improved method for mutually separating minerals, in order to control the process from a slurry containing valuable minerals, by adjusting the partial pressure of oxygen of the gas fed in the process, so that the gases fed in the separate steps of the process are recirculated.

According to the present invention, the partial pressure of oxygen is controlled in order to mutually separate minerals in the various steps of treating a slurry containing valuable minerals by recirculating the gas conducted to the subsequent steps, i.e. flotation, precipitation and filtering. Part of the oxygen is consumed in the oxidation reactions of the mineral surfaces, and when the gas exhausted from the treatment is recirculated, the nitrogen content of the gas is increased, and the potential of the mineral surfaces can be adjusted by means of the recirculation gas. In a concentration process, for instance sulfur compounds and chemicals consume oxygen, and the oxygen content of the atmosphere is decreased, when the same gas is reused. The additional oxygen needed in the process is fed for instance in the form of air, oxygen or oxygen enriched gas, according to the oxidation requirements of the minerals in question. The additional oxygen can also be fed so that part of the additional oxygen is ozone or chlorine.

In a process according to the method of the invention, essentially all suitable steps, such as grinding, pumping, conditioning and flotation steps as well as both precipitation and filtering are closed in a recirculation gas atmosphere. In this way, there is avoided an excessive oxidation of the minerals in all process steps. For example pump wells, when they are open, function as mineral slurry oxidizers, and therefore also pump wells are integrated in the closed gas circulation. A closed gas circulation means that the equipment belonging in the process is provided with the necessary structures, such as lid structures, in order to ensure the recovery of gas. In addition, a process applying the method according to the invention is provided with equipment needed for gas transfer and recirculation, such as recirculation pipework, at least one fan and a storage tank. In order to define the correct oxygen content of the recirculation gas, the method is observed for instance by measuring the share of oxygen in the recirculation gas, or by observing the potential of the ore slurry. In order to observe the slurry to be treated in the process, for measuring the state of the solid or pulverous surfaces of the mineral electrodes in the process slurry, there are applied potential measurements, impedance measurements, ultrasound initiated or potential pulse initiated zeta potential measurements, either separately or together with measurements of the contents of reagents present in the process or added in the process. Among the surfaces to be measured, there can also be the specific surfaces of the equipment or of the equipment parts used in the process.

According to the invention, the overoxidation or overreduction of the minerals contained in the slurry can be prevented by a method that is as expedient and cost-effective as possible. Most chemical reactions that take place in the different process steps are practically irreversible. Once the change has taken place, there is no technical method for returning thaminerais to the optimal state. In order to avoid overoxidation or overreduction, the feeding of secondary gas according to the invention is divided according to the different process steps, so that to each process step, there is fed either the same secondary gas, or the partial pressure of oxygen in the secondary gas is changed, when necessary, between the gas additions fed in the different process steps. Thus, in case it is necessary on the basis of the performed measurements, recirculation gas can be used in at least one process step, the content of said oxidizing gas being lower than the oxygen content of air. In that case for instance hydrogen sulphide or sulphur dioxide can be used as the reducing gas. Likewise, when necessary, at least in one process step there can be used recirculation gas, the content of said oxidizing gas being higher than the oxygen content of air.

The closed gas circulation according to the invention results in that the whole process is made to work in an economically advantageous way with oxidation potentials lower than in the prior art. Thus it is possible to achieve a better selectivity in the separation of minerals, and a completely new level of operation is achieved as regards the mineral recovery-content graph. At the same time, reagent expenses are decreased, and the productivity of the process equipment grows. Moreover, the suction and underpressure naturally created by the rotation of the propellers or other agitation equipment employed in the treatment of valuable minerals can be made use of in the recirculation of gases. Likewise, in order to improve the efficiency of the gas recirculation, in adjusting the contents of the oxidizing gases, there can advantageously be utilized the natural impoverishment of the oxidizing gases taking place in the process.

Because the whole process of treating the slurry containing valuable metals is carried out in a closed gas circulation, this means for instance that the oxygen content in grinding is on a lower level than when operating in a normal air atmosphere. As a consequence, the corrosion of the lining materials of the mill used in the grinding process is slowed down, and the consumption of the balls and rods used in the mill is decreased. Advantageous effects of the method can also be observed in the other steps of the process.

In flotation, among the many significant factors, the structure of the froth has been and still is one of the most essential. In the final estimation froth structure, if nothing else, reveals the problems possibly caused by the flotation gas, depending on the raw material to be treated, on the chemicals etc. When recirculation gases are in the flotation process used according to the invention, the froth structure can be optimized remarkably more efficiently. The optimization of the froth structure can be carried out from step to step in order to correspond to the separation selectivity of the minerals and to the requirements set for froth structure by the transfer of the minerals taking place in the froth, such as mechanical strength. Thus also heavy minerals, such as precious metals and platinum group minerals can be kept, for instance by loose bonds, bound to mutually connected particles, i.e. flocks, or to flocks, i.e. misels, formed by different molecules, and at the same time the specific weight is reduced by means of the hydrocarbons.

When applying the method according to the invention, stronger mixtures can be used in the process, adjusted according to the conditions at hand. For the process, this in turn means shorter delays, higher capacities and lower expenses, without the drawback that the recoveries to a desired phase should become smaller. The method according to the invention is particularly suited to the flotation, precipitation and filtering as well as other connected processing of ores and raw materials containing copper, nickel, zinc, cobalt, lead, silver, platinum and palladium.

The invention is described in the following example with respect to flotation.

EXAMPLE

The ore to be treated in the process contained both copper sulfides, such as chalcopyrite $CuFeS_2$, bornite $Cu_5FeS_4$, different $Cu_xS$ phases and pyrite $FeS_2$.

The ore was ground together with alloyed metal grinding bodies to the fineness 89.3% below 74 micrometers, in a nitrogen atmosphere that contained 11% oxygen. The flotation was performed according to the invention in a closed gas circulation created around the grinding and flotation equipment by using conventional collectors, i.e. xanthate and dithio phosphate by nitrogen containing 2% oxygen at the pH 10.8, by applying an addition of $Ca(OH)_2$.

As regards the electrochemical potentials of chalcopyrite $CuFeS_2$ and pyrite $FeS_2$, the conditions were optimized, so that $E_{CuFeS2}$ was within the range −160 mV vs AgCl/Ag and $E_{FeS2}$ −75 mV vs AgCl/Ag. The administration of the flotation reagents was optimized by maximizing the hydrophobicity differences by means of impedance analysis between chalcopyrite and pyrite.

In flotation, the obtained $FeS_2$ content for the copper preconcentrate was 8.4%, and the obtained silicate content was 4.7%. By repeating the preconcentrate in the above described conditions, the copper recovery of the final copper concentrate, when measured from the ore, was 93.5%, and the $FeS_2$ content of the copper concentrate was 4.4% and the silicate content was 2.2%.

When a corresponding experiment, with the same grinding, was according to the prior art performed in an air atmosphere, without the closed gas circulation created around the flotation equipment, the flotation gas was air, and the $CuFeS_2$ potential was optimized to the value −160 mV vs AgCl/Ag, the $FeS_2$ content in the copper preconcentrate was 15.6% and the silicate content was 6.8%. In the final copper concentrate, repeated by using air, the $FeS_2$ content was 12.5%, the silicate content was 4.7% and the copper recovery was 88.6%. Let us point out that with respect to selectivity, the $FeS_2$ potential was increased too high.

When comparing in the example the values obtained by a method according to the invention with the values obtained by a method according to the prior art, it can be maintained that the copper recovery was improved by 4.9%, the silicate content was decreased more than 50%, and the pyrite content was decreased by 65%. Now the obtained copper concentrate was purer and thus easier to process further.

The invention claimed is:

1. A method for separating valuable minerals from an ore, comprising:
    grinding the ore,
    forming a slurry from the ground ore,
    measuring an electrochemical potential of the slurry,
    separating valuable minerals from the slurry by flotation, precipitation and filtering,
    carrying out the grinding, flotation, precipitation and filtering under an essentially closed recirculating gas atmosphere, and
    controlling the composition of the recirculating gas atmosphere depending on the measured electrochemical potential.

2. A method according to claim 1, wherein the recirculating gas atmosphere contains an oxidizing gas and the method comprises controlling oxygen content of the recirculating gas atmosphere depending on said measured electrochemical potential.

3. A method according to claim 2, comprising increasing oxygen content of the recirculating gas atmosphere by adding air, oxygen, or oxygen enriched gas to the recirculating gas atmosphere.

4. A method according to claim 1, comprising utilizing suction and underpressure created owing to the rotation of agitation equipment employed in at least one of grinding, flotation, precipitation, and filtering to effect recirculation of the gas atmosphere.

5. A method according to claim 1, comprising feeding a secondary gas to the grinding, flotation, precipitation and filtering steps.

6. A method according to claim 1, wherein the recirculating gas atmosphere contains a reducing gas.

7. A method according to claim 6, wherein the reducing gas is hydrogen sulphide or sulphur dioxide.

8. A method according to claim 1, wherein the step of measuring an electrochemical potential of the slurry comprises measuring an oxidation potential using a mineral electrode.

9. A method according to claim 1, wherein the step of measuring an electrochemical potential of the slurry comprises measuring impedance.

10. A method according to claim 1, wherein the step of measuring an electrochemical potential of the slurry comprises measuring contents of reagents present in the slurry.

11. A method for separating valuable minerals from an ore, comprising:
grinding the ore,
forming a slurry from the ground ore,
separating valuable minerals from the slurry by flotation, precipitation and filtering,
carrying out the grinding, flotation, precipitation and filtering under an essentially closed recirculating gas atmosphere,
measuring content of oxygen in the recirculating gas atmosphere, and
controlling the composition of the recirculating gas atmosphere depending on the measured content of oxygen.

12. A method according to claim 11, wherein the recirculating gas atmosphere contains an oxidizing gas and the method comprises controlling oxygen content of the recirculating gas atmosphere depending on said measured content of oxygen.

13. A method according to claim 12, comprising increasing oxygen content of the recirculating gas atmosphere by adding air, oxygen, or oxygen enriched gas to the recirculating gas atmosphere.

14. A method according to claim 11, comprising utilizing suction and underpressure created owing to the rotation of agitation equipment employed in at least one of grinding, flotation, precipitation, and filtering to effect recirculation of the gas atmosphere.

15. A method according to claim 11, comprising feeding a secondary gas to the grinding, flotation, precipitation and filtering steps.

16. A method according to claim 11, wherein the recirculating gas atmosphere contains a reducing gas.

17. A method according to claim 16, wherein the reducing gas is hydrogen sulphide or sulphur dioxide.

18. A method according to claim 11, wherein the recirculating gas atmosphere contains an oxidizing gas.

19. A method according to claim 18, wherein the oxidizing gas is ozone or chlorine.

20. A method for separating valuable minerals from an ore, comprising:
grinding the ore under an essentially closed recirculating gas atmosphere containing an oxidizing gas and having a partial pressure of oxygen lower than atmospheric air,
forming a slurry from the ground ore, and
separating valuable minerals from the slurry by flotation under an essentially closed recirculating gas atmosphere containing an oxidizing gas and having a partial pressure of oxygen lower than atmospheric air.

21. A method according to claim 20, wherein the recirculating gas atmosphere under which grinding takes place contains oxygen and the method comprises measuring content of oxygen in the recirculating gas atmosphere under which grinding takes place and controlling the composition of the recirculating gas atmosphere under which grinding takes place depending on the measured content of oxygen.

22. A method according to claim 20, comprising measuring an electrochemical potential of the slurry and controlling the composition of the recirculating gas atmosphere under which grinding takes place depending on the measured electrochemical potential.

23. A method according to claim 20, wherein the recirculating gas atmosphere under which flotation takes place contains oxygen and the method comprises measuring content of oxygen in the recirculating gas atmosphere under which flotation takes place and controlling the composition of the recirculating gas atmosphere under which flotation takes place depending on the measured content of oxygen.

24. A method according to claim 20, comprising measuring an electrochemical potential of the slurry and controlling the composition of the recirculating gas atmosphere under which flotation takes place depending on the measured electrochemical potential.

* * * * *